United States Patent
Chung et al.

(10) Patent No.: US 9,403,348 B2
(45) Date of Patent: Aug. 2, 2016

(54) BIODEGRADABLE SHEETS HAVING ADHESIVE LAYER

(71) Applicant: LG HAUSYS, LTD., Seoul (KR)

(72) Inventors: Gun Soo Chung, Cheongju-si (KR); Youn Woo Nam, Cheongju-si (KR); Si Young Lee, Cheongju-si (KR); Min Lee, Ansan-si (KR)

(73) Assignee: LG HAUSYS, LTD., Seoul (KR)

( * ) Notice: Subject to any disclaimer, the term of this patent is extended or adjusted under 35 U.S.C. 154(b) by 187 days.

(21) Appl. No.: 14/116,818

(22) PCT Filed: Sep. 21, 2012

(86) PCT No.: PCT/KR2012/007608
§ 371 (c)(1),
(2) Date: Nov. 11, 2013

(87) PCT Pub. No.: WO2014/046320
PCT Pub. Date: Mar. 27, 2014

(65) Prior Publication Data
US 2014/0329065 A1 Nov. 6, 2014

(51) Int. Cl.
*B32B 3/10* (2006.01)
*B32B 27/36* (2006.01)
*C09J 167/04* (2006.01)
(Continued)

(52) U.S. Cl.
CPC . *B32B 27/36* (2013.01); *B32B 3/10* (2013.01); *B32B 5/022* (2013.01); *B32B 27/10* (2013.01); *B32B 27/12* (2013.01); *B32B 27/18* (2013.01); *B32B 27/22* (2013.01); *B32B 27/302* (2013.01); *B32B 27/304* (2013.01); *B32B 27/34* (2013.01); *B32B 27/40* (2013.01); *C08J 5/124* (2013.01); *C09J 7/0296* (2013.01); *C09J 167/04* (2013.01); *B32B 2250/04* (2013.01); *B32B 2270/00* (2013.01); *B32B 2307/412* (2013.01); *B32B 2307/7163* (2013.01); *B32B 2307/75* (2013.01); *B32B 2607/00* (2013.01); *C08J 2367/04* (2013.01); *C08J 2467/04* (2013.01);
(Continued)

(58) Field of Classification Search
CPC .. B32B 27/36; Y10T 428/24901; E04F 13/00
See application file for complete search history.

(56) References Cited

U.S. PATENT DOCUMENTS

2005/0003174 A1* 1/2005 Ikeda ............... B32B 27/10
428/219
2007/0088099 A1* 4/2007 Mentink et al. ............ 523/124
2011/0217523 A1* 9/2011 Huang et al. ............ 428/195.1

FOREIGN PATENT DOCUMENTS

CN 101250385 A 8/2008
CN 103534091 A 1/2014
(Continued)

OTHER PUBLICATIONS

Translation of JP 2004-231797.*
(Continued)

*Primary Examiner* — Bruce H Hess
*Assistant Examiner* — Christopher Polley
(74) *Attorney, Agent, or Firm* — Hauptman Ham, LLP

(57) ABSTRACT

The present invention relates to sheets. The sheets include an adhesive layer, a base layer formed on the adhesive layer, a resin layer formed on the base layer, and a printed layer formed on the resin layer. Each of the adhesive layer and the resin layer includes a polylactic acid (PLA) resin. The sheets are biodegradable.

10 Claims, 3 Drawing Sheets

(51) Int. Cl.

| | | |
|---|---|---|
| *B32B 5/02* | (2006.01) | |
| *C09J 7/02* | (2006.01) | |
| *B32B 27/10* | (2006.01) | |
| *B32B 27/12* | (2006.01) | |
| *B32B 27/18* | (2006.01) | |
| *B32B 27/22* | (2006.01) | |
| *B32B 27/30* | (2006.01) | |
| *B32B 27/34* | (2006.01) | |
| *B32B 27/40* | (2006.01) | |
| *C08J 5/12* | (2006.01) | |

(52) U.S. Cl.
CPC ........ *C09J2467/00* (2013.01); *C09J 2467/006* (2013.01); *Y10T 428/24901* (2015.01)

(56) References Cited

FOREIGN PATENT DOCUMENTS

| | | | |
|---|---|---|---|
| JP | 08272295 A | | 10/1996 |
| JP | 2004231797 A | * | 8/2004 |
| JP | 2004-331904 A | | 11/2004 |
| JP | 2005-263294 A | | 9/2005 |
| JP | 2006-070091 A | | 3/2006 |
| JP | 2006-131705 A | | 5/2006 |
| JP | 2008-056734 A | | 3/2008 |
| JP | 2009144137 A | | 7/2009 |
| JP | 2010-070699 A | | 4/2010 |
| JP | 2011-094123 A | | 5/2011 |
| JP | 2011-118340 A | | 6/2011 |
| JP | 2012-512053 A | | 5/2012 |
| KR | 100763616 B1 | | 10/2007 |
| KR | 20100029873 A | | 3/2010 |
| KR | 100956627 B1 | | 5/2010 |
| WO | WO 2010050730 A2 | * | 5/2010 |

OTHER PUBLICATIONS

International Search Report for PCT/KR2012/007608 mailed on Apr. 19, 2013.
Written Opinion for PCT/KR2012/007608 mailed on Apr. 19, 2013.
Chinese Office Action dated Oct. 28, 2014.
Japanese Office Action for corresponding Japanese Application No. 2014-536970 dated Mar. 10, 2015.
Chinese Office Action dated Jul. 17, 2015 in connection with the counterpart Chinese Patent Application No. 201280022769.2.

* cited by examiner

BIODEGRADABLE SHEETS HAVING ADHESIVE LAYER

CROSS REFERENCE TO RELATED APPLICATION

This application is the National Phase application of International Application No. PCT/KR2012/007608 filed on Sep. 21, 2012, which is incorporated herein by reference in its entirety.

TECHNICAL FIELD

The present invention relates to sheets, and more particularly, to biodegradable sheets including an adhesive layer, a base layer formed on the adhesive layer, a resin layer formed on the base layer, and a printed layer formed on the resin layer wherein each of the adhesive layer and the resin layer includes a polylactic acid (PLA) resin.

BACKGROUND ART

Sheets using petroleum resins such as polyvinyl chloride (PVC) are widely used in various building structures such as houses, mansions, apartments, offices, and stores.

Such sheets are produced by T-die extrusion or calendering of resins such as polyvinyl chloride (PVC). Raw materials for these sheets are exclusively derived from limited resources such as crude oil. It is thus anticipated that depletion of petroleum resources will lead to various problems related to the supply of raw materials.

As interest in environmental issues is recently growing in importance, polyvinyl chloride (PVC) sheets are problematic in that they are likely to emit harmful substances and create an environmental burden even after disposed of.

DISCLOSURE

Technical Problem

An aspect of the present invention is to provide an environmentally friendly sheet that uses a PLA resin, which can solve problems associated with the supply of raw materials of the constituent layers.

Another aspect of the present invention is to provide a sheet which has an adhesive layer including a PLA resin, which avoids the need for additional work for attachment, thus being advantageous in terms of convenience.

Technical Solution

In accordance with an aspect of the present invention, a biodegradable sheet includes an adhesive layer, a base layer formed on the adhesive layer, a resin layer formed on the base layer, and a printed layer formed on the resin layer wherein at least one layer of the adhesive layer and the resin layer includes a PLA resin.

In accordance with another aspect of the present invention, a biodegradable sheet includes an adhesive layer, a base layer formed on the adhesive layer, a resin layer formed on the base layer, a printed layer formed on the resin layer, and a surface-treated layer formed on the printed layer wherein at least one layer of the adhesive layer and the resin layer includes a PLA resin.

In accordance with a further aspect of the present invention, a biodegradable sheet includes an adhesive layer, a resin layer formed on the adhesive layer, and a printed layer formed on the resin layer wherein at least one layer of the adhesive layer and the resin layer includes a PLA resin.

In accordance with a further aspect of the present invention, a biodegradable sheet includes an adhesive layer, a resin layer formed on the adhesive layer, a printed layer formed on the resin layer, and a surface-treated layer formed on the printed layer wherein at least one layer of the adhesive layer and the resin layer includes a PLA resin.

Advantageous Effects

The biodegradable sheets of the present invention use a PLA resin derived from vegetable resources as a substitute for conventional PVC. Therefore, the present invention can solve problems associated with the supply of raw materials arising from depletion of petroleum resources.

In addition, the biodegradable sheets of the present invention emit less environmentally harmful substances such as $CO_2$ during production and are safely discarded.

Further, due to the formation of the adhesive layer, the biodegradable sheets of the present invention require no extra work for attachment, thus being advantageous in terms of convenience.

Furthermore, the biodegradable sheets of the present invention are applicable to a wide range of fields, including wallpapers of buildings and covers of electronic products.

BEST MODE

Figure 1:
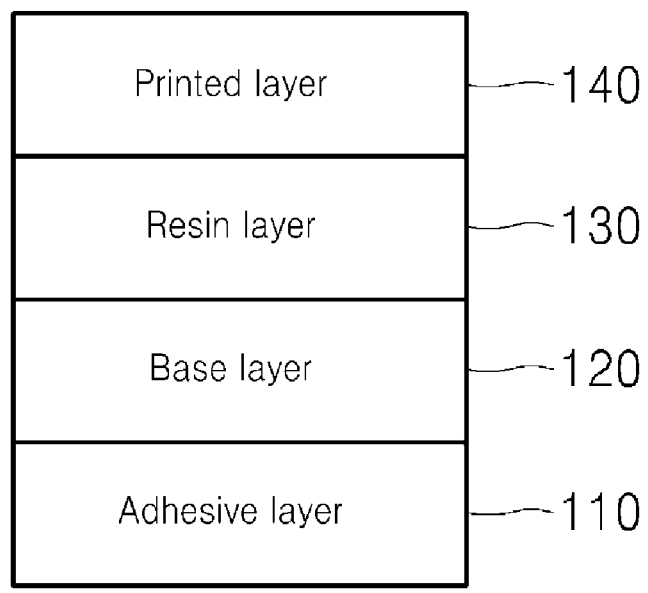
FIGS. 1 to 4 are cross-sectional views illustrating embodiments of biodegradable sheets according to the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims. Like components will be denoted by like reference numerals throughout the specification.

Hereinafter, biodegradable sheets according to preferred embodiments of the present invention will be described in detail with reference to the accompanying drawings.

FIG. 1 is a cross-sectional view illustrating a biodegradable sheet according to one embodiment of the present invention.

As illustrated in FIG. 1, the biodegradable sheet includes an adhesive layer 110, a base layer 120, a resin layer 130, and a printed layer 140 formed in this order from the bottom. At least one layer of the adhesive layer 110 and the resin layer 120 includes a PLA resin.

PLA resins are thermoplastic polyesters of lactide or lactic acid. For example, PLA resins may be produced by polymerization of lactic acid, which is obtained by fermentation of starch extracted from corn or potatoes. The use of PLA resins obtained from readily available renewable vegetable resources such as corn and potatoes can effectively solve problems arising from depletion of petroleum resources.

PLA resins are environmentally friendly materials that emit far fewer environmentally harmful substances such as $CO_2$ during use or when discarded than petroleum-based substances such as polyvinyl chloride (PVC), and are readily biodegradable once disposed of under natural environmental conditions.

PLA resins can be classified into crystalline PLA (c-PLA) resins and amorphous PLA (a-PLA) resins. Plasticizers may bleed toward the surface of sheets using crystalline PLA resins. In view of this phenomenon, it is preferred to use amorphous PLA resins. The use of amorphous PLA resins avoids the need to add compatibilizers, which are essential components in PVC production to prevent the occurrence of bleeding. Particularly, 100% amorphous PLA resins are most preferably used. If needed, combinations of crystalline PLA resins and amorphous PLA resins may be used.

The term "PLA resin' as used herein is intended to include a PLA resin in the form of a sol, a PLA resin blended with a bioresin, and a PLA resin blended with a synthetic resin.

First, a PLA resin in the form of a sol may be used in the biodegradable sheet of the present invention. The PLA resin in the form of a sol may be produced by adding a PLA resin to a volatile solvent to prepare a PLA solution, adding a plasticizer to the PLA solution, and drying the mixture to remove the volatile solvent. Alternatively, the PLA resin in the form of a sol may be produced by adding a plasticizer to a PLA resin in a pellet or powder form.

A blended resin of a PLA resin and a bioresin may also be used in the biodegradable sheet of the present invention. The bioresin type is not limited so long as it is biodegradable. Particularly, the bioresin is selected from cellulose, chitin, starch, polyhydroxyalkanoate (PHA), polyhydroxybutyrate valerate (PHBV), polyvinyl alcohol (PVA), polyglycolic acid (PGA), polybutylene succinate (PBS), poly(butylene adipate-co-butylene succinate) (PBSA), polybutylene adipate terephthalate (PBAT), polycaprolactone (PCL), poly(ester-amide), poly(ester-urethane), and mixtures thereof. These bioresins are preferred in terms of compatibility with PLA resins and biodegradability.

Preferably, the blended resin includes 10 to 70 parts by weight of the bioresin, based on 100 parts by weight of the PLA resin. If the bioresin is present in an amount of less than 10 parts by weight, blending is likely to be ineffective. Meanwhile, the presence of the bioresin in an amount exceeding 70 parts by weight may cause problems in terms of compatibility with other additives.

The biodegradable sheet of the present invention may also use a blended resin of a PLA resin and a synthetic resin. The synthetic resin is selected from polyvinyl chloride (PVC), polyethylene glycol (PEG), ethylene vinyl acetate (EVA), thermoplastic elastomers (TPEs), thermoplastic polyurethane (TPU), thermoplastic starch (TPS), epoxidized natural rubbers (ENRs), ionomers, styrene butadiene styrene (SBS), nitrile butadiene rubbers (NBRs), styrene ethylene butylene styrene (SEBS), acrylates, acrylonitrile butadiene styrene (ABS), polyolefin modified with compatibilizer, polyurethane (PU), polyamide, polyester, and mixtures thereof. These synthetic resins are preferred in terms of compatibility with PLA resins and biodegradability.

Preferably, the blended resin includes 10 to 70 parts by weight of the synthetic resin, based on 100 parts by weight of the PLA resin. The presence of the synthetic resin in an amount of less than 10 parts by weight results in ineffective blending. Meanwhile, the presence of the synthetic resin in an amount exceeding 70 parts by weight may cause problems in terms of compatibility with other additives and inhibit the objective of biodegradability.

A plasticizer and a processing aid may be added to the PLA resin constituting the biodegradable sheet of the present invention.

The plasticizer is particularly preferably a non-phthalate plasticizer. The non-phthalate plasticizer is environmentally friendly and softens the PLA resin to achieve enhanced thermoplasticity, which facilitates molding of the PLA resin at high temperature. The non-phthalate plasticizer is preferably selected from citric acid, citrates, epoxidized vegetable oils, fatty acid esters, polyethylene glycol, polyethylene propylene glycol, and glycerol esters.

The non-phthalate plasticizer is preferably used in an amount of 10 to 50 parts by weight, based on 100 parts by weight of the PLA resin.

If the plasticizer content is less than 10 parts by weight, based on 100 parts by weight of the PLA resin, the hardness of the PLA resin may increase, resulting in poor processability. Meanwhile, if the plasticizer content exceeds 50 parts by weight, based on 100 parts by weight of the PLA resin, compatibility with the other components may be poor, causing degradation of physical properties.

The processing aid serves to increase the melt strength of the PLA resin. Low melt strength or heat resistance inherent to the PLA resin is the reason why the addition of the processing aid is preferred.

The processing aid is preferably selected from acrylic copolymers, epoxy copolymers, urethane copolymers, and polyolefin copolymers. The processing aid compensates for the melt strength of the PLA resin to facilitate processing, for example, calendering of the PLA resin.

The processing aid is preferably used in an amount of 1 to 10 parts by weight, based on 100 parts by weight of the PLA resin.

If the processing aid content is less than 1 part by weight, based on 100 parts by weight of the PLA resin, sufficient improvements in the melting efficiency and melt strength of the PLA resin are not obtained. Meanwhile, if the processing aid content exceeds 10 parts by weight, based on 100 parts by weight of the PLA resin, a rise in production cost is inevitable and poor compatibility with other materials constituting the layers of the sheet may be caused, leading to deterioration in overall physical properties of the layers.

A filler, a lubricant, an additive or a mixture thereof may be further added to the PLA resin constituting the biodegradable sheet of the present invention.

The filler is generally added to prevent changes in the physical properties of the PLA resin composition and to reduce the production cost of the sheet. There is no restriction on the kind of the filler. The filler may be one commonly used in the art and is preferably calcium carbonate ($CaCO_3$).

The filler is preferably used in an amount of 50 to 150 parts by weight, based on 100 parts by weight of the PLA resin.

The presence of the filler in an amount of less than 50 parts by weight, based on 100 parts by weight of the PLA resin, does not contribute to cost reduction. Meanwhile, the presence of the filler in an amount exceeding 150 parts by weight may cause changes in physical properties.

The lubricant is added to prevent the PLA resin from adhering to a calender roll or a press during processing, for example, calendering of the PLA resin.

Examples of such lubricants include, but are not limited to, stearic acid, waxes, hydrocarbons, and silicone. Environmentally friendly higher fatty acids are particularly preferable in the present invention. As an example of the higher fatty acids, there may be mentioned stearic acid, which is a saturated higher fatty acid having 18 carbon atoms.

The lubricant is preferably used in an amount of 0.1 to 8 parts by weight, based on 100 parts by weight of the PLA resin.

If the lubricant content is less than 0.1 parts by weight, based on 100 parts by weight of the PLA resin, the lubricant does not exhibit any of the desired effects. Meanwhile, if the lubricant content exceeds 8 parts by weight, based on 100 parts by weight of the PLA resin, the impact resistance, heat resistance and gloss of the PLA resin may be degraded.

As the additive, there may be used, for example, a cross-linking agent or an antioxidant.

The cross-linking agent serves to increase the molecular weight of the PLA resin through chain extension, achieving improved physical properties such as high tensile strength and heat resistance.

Examples of such cross-linking agents include, but are not necessarily limited to, diisocyanates, epoxy group-containing copolymers, and hydroxycarboxylic acid compounds.

The antioxidant serves to prevent the mechanical properties (e.g., impact resistance) of the PLA resin from deterioration resulting from oxidation of the PLA resin.

Examples of such antioxidants include, but are not necessarily limited to, phenolic antioxidants, sulfur-based antioxidants, and phosphorus-based antioxidants, which are currently in use for plastics.

The antioxidant is selected from those that are non-toxic, stable at processing molding temperatures, and highly compatible with the resin without losing their activity and impeding the processability of the resin.

The cross-linking agent or the antioxidant as the additive is preferably used in an amount of 0.2 to 5 parts by weight, based on 100 parts by weight of the PLA resin.

If the additive content is less than 0.2 parts by weight, based on 100 parts by weight of the PLA resin, the effect of using the additive cannot be obtained. Meanwhile, if the additive content exceeds 5 parts by weight, based on 100 parts by weight of the PLA resin, the molding processability of the PLA resin may deteriorate and the production cost of the sheet may rise.

An explanation will be given concerning the individual layers constituting sheets of the present invention illustrated in FIGS. 1 to 4.

First, FIG. 1 is a cross-sectional view illustrating a biodegradable sheet according to one embodiment of the present invention.

As illustrated in FIG. 1, the biodegradable sheet includes an adhesive layer 110, a base layer 120, a resin layer 130, and a printed layer 140 formed in this order from the bottom. At least one layer of the adhesive layer 110 and the resin layer 130 includes a PLA resin.

In the present invention, the formation of the adhesive layer 110 avoids the need for additional work to attach the sheet to an adherend, thus ensuring convenience.

The adhesive layer 110 includes a PLA resin to ensure biodegradability.

A mixture of the PLA resin and an adhesive solvent is used to form the adhesive layer 110. The adhesive solvent is not particularly limited so long as it is adhesive. The adhesive solvent is preferably selected from methyl ethyl ketone (MEK), methyl isobutyl ketone (MIBK), acetone, ethyl alcohol, and mixtures thereof. 10 to 40% by weight of the PLA resin and 60 to 90% by weight of the solvent are preferably used to form the adhesive layer 110.

The base layer 120 supports the overlying resin layer 130 and printed layer 140. The base layer 120 may be formed using any suitable material known in the art. Non-limiting examples of materials for the base layer 120 include vellum paper, a non-woven fabric, and a cotton fabric.

The vellum paper is composed of pulp, and the non-woven fabric is composed of a combination of pulp and polyester.

The basis weight of the vellum paper, the non-woven fabric or the cotton fabric constituting the base layer is preferably from 80 to 200 $g/m^2$. If the base layer has a basis weight of less than 80 $g/m^2$, the sheet may be damaged, for example, tearing may occur during construction or in use. Meanwhile, if the base layer has a basis weight exceeding 200 $g/m^2$, the base layer becomes excessively heavy and is apt to crack and curl, making it difficult to construct the sheet.

The resin layer 130 formed on the base layer 120 imparts an aesthetic effect to the sheet. The presence of a biodegradable PLA resin in the resin layer 110 ensures environmental friendliness of the resin layer.

As explained above, the resin layer 130 may use a PLA resin containing a plasticizer and a processing aid. A filler, a lubricant, an additive or a mixture thereof may be further added to the PLA resin. The composition of the components has been described above.

The resin layer 130 may be formed by a process known in the art. Examples of suitable processes include, but are not limited to, calendering and T-die extrusion.

The printed layer 140 formed on the resin layer 130 imparts various patterns and/or colors to the sheet to further improve the aesthetics of the sheet. There is no particular restriction on the method for the formation of the printed layer. For example, the printed layer may be formed by any suitable printing technique known in the art, such as gravure printing, transfer printing, digital printing or rotary printing. A known photorealistic printing technique such as ink-jet printing may also be used to impart a more natural aesthetic effect.

Figure 2:
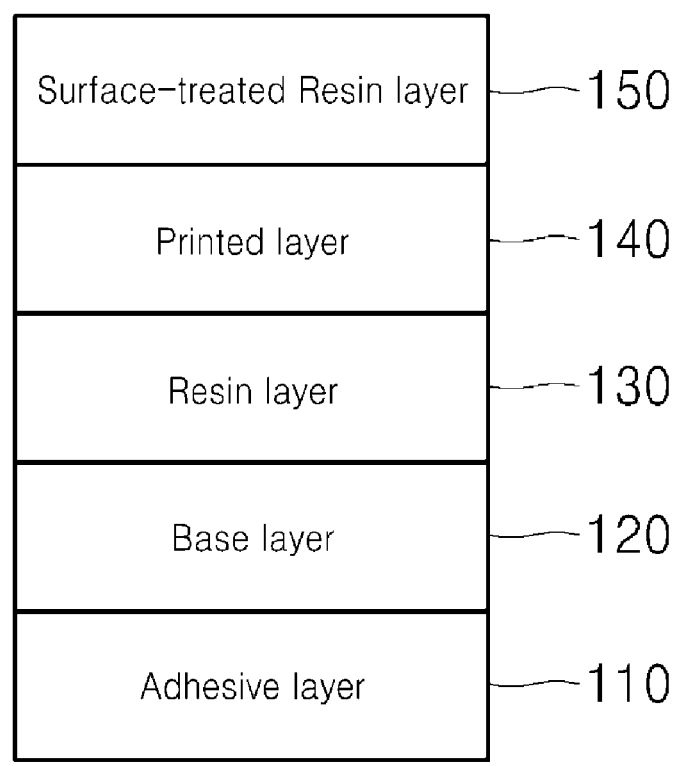

FIG. 2 is a cross-sectional view illustrating a biodegradable sheet according to another embodiment of the present invention.

As illustrated in FIG. 2, the biodegradable sheet includes an adhesive layer 110, a base layer 120, a resin layer 130, a printed layer 140, and a surface-treated layer 150 formed on the printed layer 140.

The surface-treated layer 150 formed on the printed layer 140 serves to improve the durability of the sheet while protecting the pattern formed on the upper side of the printed layer 140. The surface-treated layer 150 may be formed using a transparent resin, such as an acrylic resin or a urethane resin.

Figure 3:
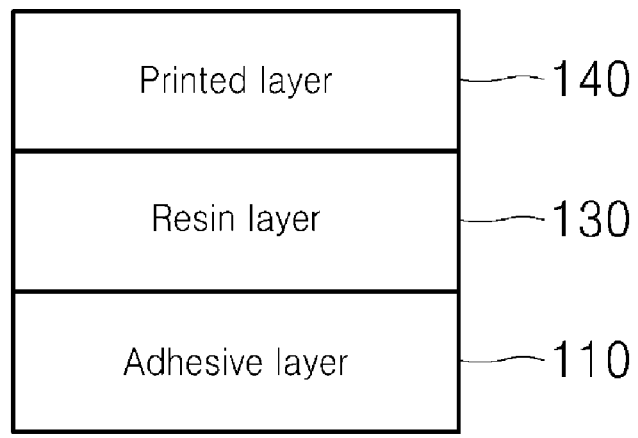
Figure 4:
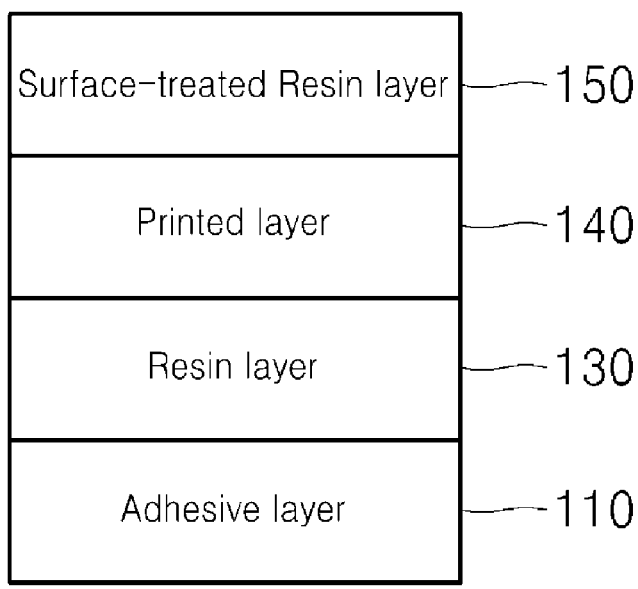

FIGS. 3 and 4 are cross-sectional views illustrating biodegradable sheets according to further embodiments of the present invention.

First, the biodegradable sheet illustrated in FIG. 3 may include an adhesive layer 110, a resin layer 130, and a printed layer 140.

That is, the use of a PLA resin can ensure flexibility of the sheet even without a base layer, making the sheet environmentally friendly.

Specific physical properties of the adhesive layer 110, the resin layer 130 and the printed layer 140 have already been described above, and thus repeated explanation thereof is omitted here.

The biodegradable sheet illustrated in FIG. 4 may further include a surface-treated layer 150 formed on the printed layer 140 illustrated in FIG. 3.

Likewise, the biodegradable sheet has no base layer. The surface-treated layer 150 has already been described above, and thus repeated explanation thereof is omitted here.

Production of Inventive Sheets and Comparative Sheet

In the following examples and comparative example, sheets according to preferred embodiments of the present invention and a comparative sheet were produced. However, these examples are provided for illustrative purposes only and are not be construed as in any way limiting the invention.

Embodiments that are not described herein will be readily recognized and appreciated by those skilled in the art, and thus explanation thereof is omitted.

EXAMPLES

Production Methods of Constituent Layers

1. Formation of Adhesive Layer 40 wt % of a PLA resin was mixed with 60 wt % of methyl ethyl ketone at 80° C. to prepare a PLA resin paste for an adhesive layer.

2. Base Layer

A base layer was formed using a non-woven fabric composed of 70% pulp and 30% polyester.

3. Formation of Resin Layer 100 parts by weight of a PLA resin, 50 parts by weight of citric acid, 150 parts by weight of $CaCO_3$, 10 parts by weight of an acrylic copolymer, 8 parts by weight of stearic acid, and 5 parts by weight of a cross-linking agent were mixed, kneaded in a kneader at 90-200° C., followed by calendering or extrusion to produce an about 0.01 mm thick sheet.

4. Formation of Printed Layer

A water-based ink pigment and an oil-based ink pigment were mixed depending on the number of printing colors. The pigment mixture was gravure printed on the resin layer to form a pattern.

5. Formation of Surface-Treated Layer 20 wt % of an acrylic resin was mixed with 80 wt % of methyl ethyl ketone to prepare a coating solution for surface treatment.

Examples 1-8

In accordance with the layer structures shown in Table 1, the constituent layers selected from the adhesive layer, the base layer, the resin layer, the printed layer, and the surface-treated layer were sequentially laminated to produce biodegradable sheets of Examples 1-8.

Particularly, a blend of the PLA resin and a bioresin, and a blend of the PLA resin and a synthetic resin were used in the adhesive and resin layers of the biodegradable sheets of Examples 2, 3, 6, and 7, and the compositions thereof are shown in Table 1

TABLE 1

| | Adhesive layer | Base layer | Resin layer | Printed layer | Surface-treated layer |
|---|---|---|---|---|---|
| Example 1 | ○ | ○ | ○ | ○ | |
| Example 2 | ○<br>PLA 100 parts by weight<br>PBS 30 parts by weight | ○ | ○<br>PLA 100 parts by weight<br>PBS 30 parts by weight | ○ | |
| Example 3 | ○<br>PLA 100 parts by weight<br>PVC 30 parts by weight | ○ | ○<br>PLA 100 parts by weight<br>PVC 30 parts by weight | ○ | |
| Example 4 | ○ | ○ | ○ | ○ | ○ |
| Example 5 | ○ | | ○ | ○ | |
| Example 6 | ○<br>PLA 100 parts by weight<br>PBS 30 parts by weight | | ○<br>PLA 100 parts by weight<br>PBS 30 parts by weight | ○ | |
| Example 7 | ○<br>PLA 100 parts by weight<br>PVC 30 parts by weight | | ○<br>PLA 100 parts by weight<br>PVC 30 parts by weight | ○ | |
| Example 8 | ○ | | ○ | ○ | ○ |

Comparative Example

A base layer was formed using a base paper composed of 100% pulp. A paste including a PVC resin was coated on the base layer, and dried to produce a commercially available PVC silk sheet.

EVALUATIONS

The sheets of Examples 1-8 and Comparative Example were evaluated with regard to the parameters shown in Table 2, and the results were compared.

TABLE 2

| | Dimensional stability | Moisture vapor permeability | Light fastness | TVOCs |
|---|---|---|---|---|
| Example 1 | ○ | ○ | ○ | ○ |
| Example 2 | Δ | ○ | Δ | ○ |
| Example 3 | ○ | Δ | ○ | ○ |
| Example 4 | ○ | ○ | ○ | ○ |
| Example 5 | ○ | ○ | ○ | ○ |
| Example 6 | Δ | ○ | Δ | ○ |
| Example 7 | ○ | Δ | ○ | ○ |
| Example 8 | ○ | ○ | ○ | ○ |
| Comparative Example | ○ | ○ | ○ | Δ |

Dimensional stability was defined as the shrinkage of the specimen, which was calculated from the difference between the length of the specimen after dipping in a water bath and the length of the specimen after standing at 80° C. Dimensional stability was evaluated to be "good (○)" when the shrinkage was less than 2.0%, "fair (Δ)" when it was 2.0-2.2%, and "poor (x)" when it was not less than 2.2%.

Moisture vapor permeability was defined as the mass of water vapor passing through the product. Moisture vapor permeability was evaluated to be "good (○)" when the mass of passing water vapor was not less than 175 $g/m^2 \cdot 24$ hr, and "poor (x)" when it was less than 175 $g/m^2 \cdot 24$ hr.

Light fastness was graded based on the criteria specified in KS M 7305. Light fastness was evaluated to be "good (○)" when the grade was not less than 4 and "poor (x)" when it was less than 4.

Environmental friendliness refers to the emission levels of total volatile organic compounds (TVOCs) and formaldehyde (HCHO). Environmental friendliness was evaluated to be "good (○)" when the TVOC and HCHO emission levels were less than 0.1 mg/m²·h and less than 0.015 mg/m²·h, respectively, "fair (Δ)" when the TVOC emission level was 0.09-0.12 mg/m²·h or the HCHO emission level was 0.013-0.017 mg/m²·h, and poor (x) when the TVOC and HCHO emission levels were not less than 0.1 mg/m²·h and not less than 0.015 mg/m²·h, respectively.

As can be seen from the results of evaluations, the dimensional stability, moisture vapor permeability, and light fastness of the inventive biodegradable sheets were sufficient to replace the PVC sheet. The inventive biodegradable sheets emitted smaller amounts of TVOCs than the PVC sheet, demonstrating superior environmental friendliness thereof.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A biodegradable sheet comprising:
   an adhesive layer;
   a base layer formed on the adhesive layer;
   a resin layer formed on the base layer; and
   a printed layer formed on the resin layer,
   wherein at least one layer of the adhesive layer or the resin layer comprises a polylactic acid (PLA) resin,
   wherein the adhesive layer is formed from a composition that comprises 10 to 40% by weight of the PLA resin and 60 to 90% by weight of a solvent selected from methyl ethyl ketone (MEK), methyl isobutyl ketone (MIBK), acetone, ethyl alcohol, and mixtures thereof,
   wherein the PLA resin consists of amorphous PLA resin, and
   wherein the resin layer comprises 10 to 50 parts by weight of a non-phthalate plasticizer based on 100 parts by weight of the PLA resin.

2. The biodegradable sheet according to claim 1, wherein at least one layer of the adhesive layer or the resin layer comprises a blended resin of the PLA resin and a bioresin.

3. The biodegradable sheet according to claim 1, wherein at least one layer of the adhesive layer or the resin layer comprises a blended resin of the PLA resin and a synthetic resin.

4. The biodegradable sheet according to claim 1, wherein the resin layer further comprises a processing aid, or a mixture thereof.

5. The biodegradable sheet according to claim 4, wherein the resin layer further comprises a filler, a lubricant, an additive, or a mixture thereof.

6. A biodegradable sheet comprising:
   an adhesive layer;
   a resin layer formed on the adhesive layer; and
   a printed layer formed on the resin layer,
   wherein at least one layer of the adhesive layer or the resin layer comprises a polylactic acid (PLA) resin,
   wherein the adhesive layer is formed from a composition that comprises 10 to 40% by weight of the PLA resin and 60 to 90% by weight of a selected from methyl ethyl ketone (MEK), methyl isobutyl ketone (MIBK), acetone, ethyl alcohol, and mixtures thereof,
   wherein the PLA resin consists of amorphous PLA resin, and
   wherein the resin layer comprises 10 to 50 parts by weight of a non-phthalate plasticizer based on 100 parts by weight of the PLA resin.

7. The biodegradable sheet according to claim 6, wherein one layer of the adhesive layer or the resin layer comprises a blended resin of the PLA resin and a bioresin.

8. The biodegradable sheet according to claim 6, wherein one layer of the adhesive layer or the resin layer comprises a blended resin of the PLA resin and a synthetic resin.

9. The biodegradable sheet according to claim 6, wherein the resin layer further comprises a processing aid, or a mixture thereof.

10. The biodegradable sheet according to claim 9, wherein the resin layer further comprises a filler, a lubricant, an additive, or a mixture thereof.

* * * * *